United States Patent [19]
Fisher

[11] 3,845,443
[45] Oct. 29, 1974

[54] THIN FILM RESISTANCE THERMOMETER
[75] Inventor: Edward W. Fisher, Alliance, Ohio
[73] Assignee: Bailey Meter Company, Wickliffe, Ohio
[22] Filed: Nov. 12, 1973
[21] Appl. No.: 415,222

Related U.S. Application Data
[63] Continuation of Ser. No. 262,545, June 14, 1972, abandoned.

[52] U.S. Cl. .................. 338/25, 117/217, 338/28, 338/255, 338/300, 338/292, 338/308
[51] Int. Cl. .............................................. H01c 7/04
[58] Field of Search ....... 338/25, 28, 254, 255, 264, 338/275, 300, 292, 314, 308; 117/217; 317/261

[56] References Cited
UNITED STATES PATENTS
2,703,833  3/1955  Vanvor .............................. 338/275
3,075,860  1/1963  Veres ................................ 117/217
3,083,445  4/1963  Hill .................................. 338/264
3,629,772  12/1971  Beightol ............................ 338/28

FOREIGN PATENTS OR APPLICATIONS
475,667  11/1937  Great Britain ...................... 338/28

Primary Examiner—E. A. Goldberg
Attorney, Agent, or Firm—John F. Luhrs

[57] ABSTRACT

A resistance thermometer comprising a rigid support substrate coated with glass in which is bonded and hermetically sealed a narrow thin-film of metal in meandering or serpentine configuration.

9 Claims, 7 Drawing Figures

PATENTED OCT 29 1974　　3,845,443
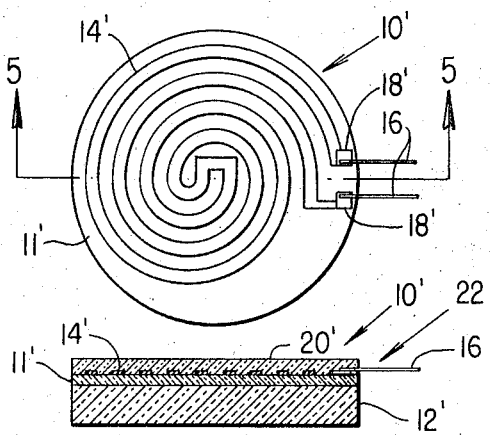
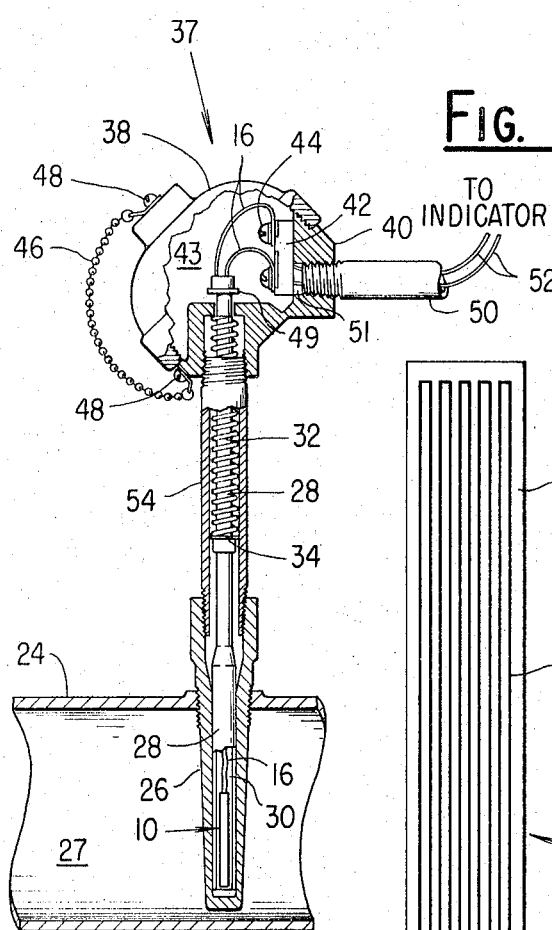
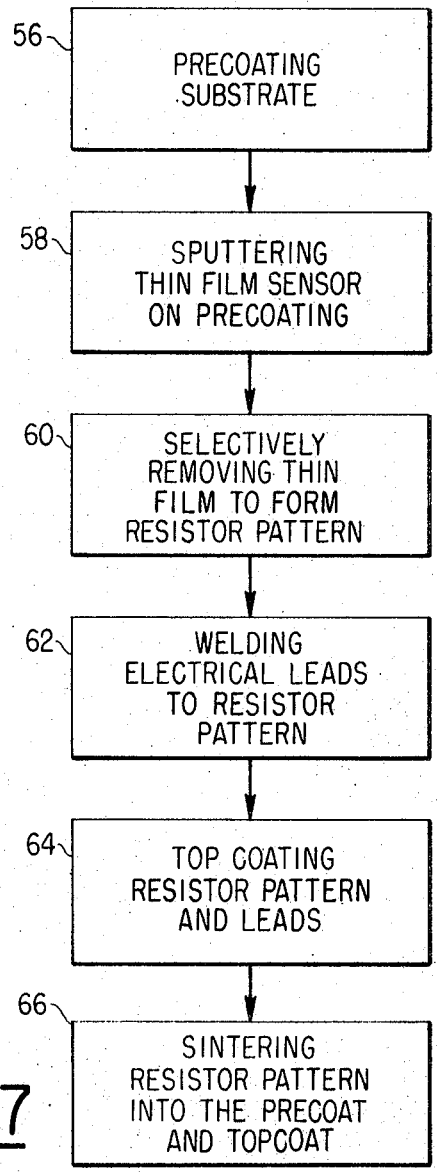
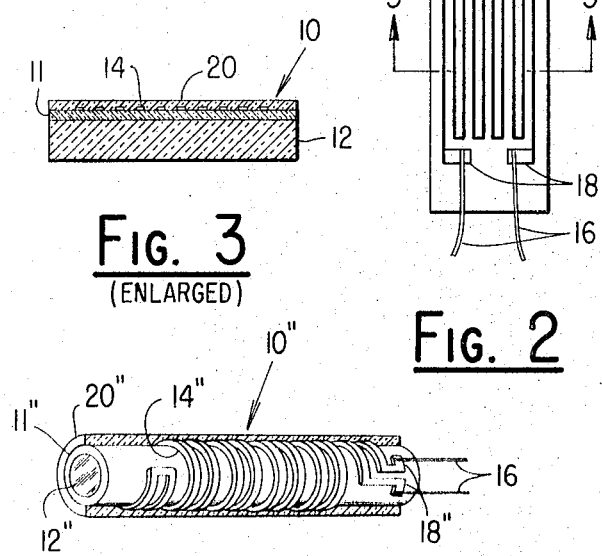

3,845,443

THIN FILM RESISTANCE THERMOMETER

This is a continuation of application Ser. No. 262,545, filed June 14, 1972, now abandoned.

BACKGROUND OF THE INVENTION

Description of the Prior Art

Resistance thermometers as known in the art generally comprise a suitably supported coiled wire having a predetermined change in electrical resistance with temperature. Nickel is a common material for the wire, however platinum wire is frequently employed for greater accuracy and for higher temperatures.

Such thermometers have received limited application in industry for several well-known reasons. The relatively low resistance of a wire of practical length having at the same time sufficient strength to withstand shock or vibration and other like conditions produces a small change in resistance per degree change in temperature. To measure such changes in resistance with accuracy necessitates the use of precision instruments operating, for example, on the Wheatstone Bridge principle. Three and preferably four leads are required between the instrument and resistance thermometer to compensate for lead resistance. Additionally no satisfactory way has been found to protect the usual resistance thermometer from deleterious atmospheres. Nickel and particularly platinum is contaminated when exposed to certain gases and materials at elevated temperatures which cause a change in the temperature coefficient of the wire resulting in an inaccurate temperature measurement. Difficulty has also been experienced in properly supporting the wire which, for accurate temperature measurement, must be in a soft annealed state which may cause sagging of the wire and short-circuiting between turns of the coil.

SUMMARY OF THE INVENTION

In accordance with my invention a narrow thin film of platinum or other metal having a suitable temperature coefficient is physically bonded to and hermetically sealed in a glass coat in turn bonded to a suitable rigid support substrate. By arranging the narrow thin film of metal in a meandering or serpentine configuration, an element having a high resistance but of small physical size is produced. The high resistance produces a relatively large change in resistance with temperature, thus eliminating the necessity for precision resistance measuring devices. Further, the high resistance renders the lead wire resistance negligible so that two lead wires in place of the usual three or four may be used without significant loss in accuracy. Further, because of the high resistance, the use of complicated and costly measuring and control devices is eliminated and relatively simple, rugged devices may be used for measuring the resistance of the thermometer. Additionally, the hermetically sealing of the thin film in a glass coat renders the thermometer impervious to contaminating gases and materials, hence the temperature coefficient of the narrow thin film having once been established thereafter remains stable. A resistance thermometer constructed in accordance with my invention, in addition to being of small physical size, has a low mass and accordingly a high speed of response to changes in temperature.

BRIEF DESCRIPTION OF THE DRAWINGS

FIG. 1 is an elevation view, partially in cross-section, and with some parts broken away, showing a typical application of a Resistance Thermometer.

FIG. 2 is an enlarged top plan view of one embodiment of my invention.

FIG. 3 is a cross-section view taken along the line 3—3 of FIG. 2 in the direction of the arrows.

FIG. 4 is an enlarged top plan view of another embodiment of my invention.

FIG. 5 is a cross-section view taken along the line 5—5 of FIG. 4 in the direction of the arrows.

FIG. 6 is an enlarged perspective view of a further embodiment of my invention.

FIG. 7 is a block diagram of the process used in forming my thin film resistance thermometer.

DESCRIPTION OF THE PREFERRED EMBODIMENT

I have shown in FIG. 1, for orientation purposes, a typical application of a resistance thermometer. Throughout the power and process industries, for example, it is necessary for measurement and control purposes, to measure continuously with a high degree of accuracy and reliability the temperatures of various fluids which, for example, flow through a conduit such as shown at 24. Inserted in the conduit 24 is a protecting well 26, housing a resistance thermometer 10 located within a protecting sheath 28. The space between the resistance thermometer 10 and sheath 28 is preferably filled with a material such as powdered aluminum oxide 30 to increase the rate of heat transmission from the fluid flowing through the conduit 26 to the resistance thermometer 10. Lead wires 16 connect the resistance thermometer 10 to a terminal board 42. Also connected to the terminal board 42 are external leads 52 usually protected by a suitable conduit such as shown at 51 which may be secured to the housing 40 by any suitable means such as by threads formed in a passageway 51. The terminal board 42 is mounted within the hollow interior 43 of a connecting head assembly generally indicated at 37 and comprising the housing 40 and a removable cover 38. A guard chain 46 secured to the housing 40 and cover 38 by screws 48 prevents loss of the cover when disengaged from the housing 40. A nipple 54 supports the connecting head assembly in the well 26. If required the protecting sheath 28 may be held in position, or bottomed in the well 26 by means of a spring 32 held between a collar 34 and housing 40. A stop 49 limits the positioning of the sheath 28 by the spring 32. I have shown leads 52 as leading to an indicator as being representative of a broad variety of measuring and control devices which may be used to measure the resistance of the resistance thermometer 10 and hence inferentially the temperature of the fluid flowing through the conduit 24.

In FIGS. 2 and 3, as generally indicated at 10, I have shown, to enlarged scale, one preferred form of my resistance thermometer. The actual physical dimensions of the rectangular embodiment shown being in the order of 2.54 cm. long by 0.30 cm. wide and having an approximate thickness of 0.06 cm. The resistance thermometer 10 comprises a rigid ceramic substrate 12, on which a glass precoat layer 11 is bonded by RF (Radio Frequency) sputtering. The substrate 12 is preferably a high purity ceramic material, having a surface smoothness of one to two microinches, or a polished crystal such as sapphire.

A narrow thin film platinum resistor 14, of a meandering or serpentine configuration is sintered into the glass precoat layer 11. The entire top surface is then coated with a glass top coat layer 20 which sets the metallurgical microstructure of and hermetically seals the resistor 14. The connecting wires 16 are welded to lands 18 formed on the ends of the resistance 18.

The resistance thermometer as described, utilizing a narrow thin-film of platinum for the resistance element having a width in the order of 3 mils and a thickness in the order of 800A may readily have a resistance in the order of 5,000 ohms at the ice point and has been found suitable for any temperature range within the approximate limits of −400°F to +1200°F. The relationship between temperature and resistance being expressed by, approximately, the well-known Callendar-Van Dusen Equation.

In FIGS. 4 and 5, I show a flat circular form of my invention having dimensions of the same order of magnitude as those of the embodiments shown in FIGS. 2 and 3. Therein the narrow thin-film platinum resistance 14' is of a flat helix configuration. As described with reference to FIG. 2, the circular substrate 12' is bonded to, by RF sputtering, a glass precoat layer 11' in which is sintered the thin-film platinum resistance 14', the entire top surface being coated with a glass top coat layer 20'.

In FIG. 6, I show a further modified form of my invention wherein the resistance thermometer 10"comprises a cylindrical substrate 12" bonded to, by RF sputtering, a glass precoat layer 11" in which is sintered a thin-film platinum resistance 14" and over which is a glass topcoat layer 20".

Referring now to FIG. 7, I illustrate by block diagrams the progressive steps used in producing my resistance thermometer. In the step indicated by block 56, the substrate 12 is coated with the high alumina glass precoat layer 11 by RF sputtering. I have found that a fast permanent bond between the substrate 12 and precoat layer 11 will be obtained by having the sputtering operation take place in an atmosphere of 99.999 percent pure argon at 8 microns absolute pressure. 600 watts RF power is applied to a glass source for approximately 30 minutes, while the source is maintained at 50 millimeters distance from the substrate.

The foregoing specific figures and those to follow should be taken as illustrative only and not as limiting, it being understood that the operations described and to be described can be successfully performed within a range of RF power, absolute pressures, deposition times, and separation of substrate from the source. Thus the sputtering operation may be performed in an argon or Xenon atmosphere having an absolute pressure of from 0.1 to 100 microns, an RF power within the range of 50 to 5,000 watts, at a deposition time within the range of 3 to 300 minutes and a source to substrate distance within the range of 2 to 200 millimeters.

In the next step 58, a thin film of platinum is deposited over the precoat layer by RF sputtering. A suitable thin platinum film can be bonded to the precoat layer if the sputtering operation is performed in an atmosphere of 99.999 percent pure argon at an absolute pressure of 10 microns and wherein 200 watts RF power is applied to a platinum source for 170 seconds.

These figures are illustrative only as a combination of power, atmosphere, pressures, deposition times, absolute pressures and separation distances may be used which will consistently provide a film of platinum of predetermined thickness securely bonded to the glass precoat layer. Thus the power may range from 50 to 5,000 watts, the atmosphere composed of substantially pure argon or Xenon at an absolute pressure of from 0.1 to 100 microns, the deposition time range from 10 to 1,000 seconds and the separation distance range between limits of 2 to 200 millimeters.

In the next step 60, the thin film of platinum is masked to provide the desired resistance pattern, which may be as previously described, depending upon the form of sapphire substrate, a flat serpentine or helix configuration or as shown in FIG. 6 be in the form of a cylindrical helix. The unmasked portion of the platinum film is RF sputter etched away by using the unmasked platinum as the source under conditions as described in step 58. Sputter etching leaves atomically clean sharp edges on the narrow platinum thin film which remains bonded to the glass precoat layer in the desired configuration. Thus excellent repeatability between pieces is obtained and the resistance thermometer is not susceptible to resistance drift with age from unstable microscopically burred edges as commonly happens with chemically etched platinum.

In the next step 62, the electrical leads 16 are welded to the lands 18. The glass precoat 11 prevents the lands 18 from peeling off their contact surface as would occur had they been formed directly on the substrate.

In the next step 64, a high alumina glass top coat 20 is applied to the resistance 14, lands 18 and that portion of the wire 16 on the lands 18, that is to say over the entire top surface of the sapphire substrate 12, by RF sputtering under the conditions described with reference to step 56. The top coat 20 sets the grain structure of the resistance 14 and prevents resistance drift with time. This grain setting is especially effective with thin films wherein the drift in grain structure is predominantly in the top surface. In the next step 66, the complete assembly is heat soaked at a temperature of approximately 1500°F to sinter the resistance 14 to the glass layers 11 and 12 and provide excellent adhesion thereto.

The above process produces a stable thin-film resistance thermometer which may be produced in quantity at reasonable cost. By providing the substrate with a glass precoat layer, I have eliminated the problems heretofore encountered when a thin film of platinum or other metal is applied directly to a sapphire substrate. The glass top coat hermetically seals the resistance so that the thermometer is impervious to otherwise deleterious atmospheres and materials. Further, a resistance thermometer so constructed is substantially shock and vibration proof as it is a solid-state device.

What I claim as new and desire to secure by Letters Patent of the United States is:

1. A resistance thermometer comprising a ceramic member having a smooth surface forming a rigid support substrate, an alumina glass precoat welded to and completely covering said smooth surface, a narrow thin-film of metal arranged in serpentine configuration welded to said alumina glass precoat and an alumina glass topcoat completely covering and welded to said glass precoat and said metal film whereby said metal film is hermatically sealed within said glass precoat and topcoat.

2. A resistance thermometer as set forth in claim 1 wherein said rigid support substrate is an aluminum oxide.

3. A resistance thermometer as set forth in claim 1 wherein said rigid support substrate is a sapphire.

4. A resistance thermometer as set forth in claim 1 wherein said thin-film of metal is a noble metal having a predetermined temperature coefficient.

5. A resistance thermometer as set forth in claim 4 wherein said noble material is platinum.

6. A resistance thermometer as set forth in claim 1 wherein said substrate is rectangular in shape.

7. A resistance thermometer as set forth in claim 1 wherein said substrate is circular in shape and said thin-film of metal is in the form of a flat helix.

8. A resistance thermometer as set forth in claim 1 wherein said substrate is a cylinder and said thin-film of metal is a cylindrical helix around said cylinder.

9. A resistance thermometer as set forth in claim 1 wherein said thin-film of metal is a thin-film of nickel.

* * * * *